United States Patent

[11] 3,619,751

| [72] | Inventors | Kaoru Sasabe<br>Ikeda-shi;<br>Fujio Oda, Ashiya-shi, both of Japan |
|---|---|---|
| [21] | Appl. No. | 859,724 |
| [22] | Filed | Sept. 22, 1969 |
| [45] | Patented | Nov. 9, 1971 |
| [73] | Assignee | Matsushita Electric Industrial Co., Ltd.<br>Osaka, Japan |
| [32] | Priorities | Sept. 27, 1968 |
| [33] | | Japan |
| [31] | | 43/70673;<br>Sept. 27, 1968, Japan, No. 43/70674 |

[54] MOTOR SPEED CONTROLLING APPARATUS
2 Claims, 10 Drawing Figs.

| [52] | U.S. Cl. | 318/325 |
|---|---|---|
| [51] | Int. Cl. | H02p 5/08 |
| [50] | Field of Search | 318/325, 345; 338/99, 100 |

[56] References Cited
UNITED STATES PATENTS

| 2,274,926 | 3/1942 | Kimmich | 338/99 X |
|---|---|---|---|
| 3,317,807 | 5/1967 | Dorfner et al. | 318/325 |
| 3,390,316 | 6/1968 | Kichr | 318/325 |
| 3,412,306 | 11/1968 | Fischer | 318/331 |

Primary Examiner—Oris L. Rader
Assistant Examiner—Robert J. Hickey
Attorney—Stevens, Davis, Miller & Mosher ABSTRACT: An apparatus for controlling the speed of an electric motor, wherein use is made of an element sensitive to a pressure, the electrical resistance of said element or a voltage developed thereacross being varied in accordance with the pressure imparted thereto, and a centrifugal force produced by a rotary member is imparted to said sensitive element so that the speed of said electric motor is controlled in accordance with variations in the electrical resistance of said sensitive element.

PATENTED NOV 9 1971

K. SASABE
F. ODA
INVENTORS

BY *Stevens, Davis, Miller & Mosher*
ATTORNEYS

MOTOR SPEED CONTROLLING APPARATUS

This invention relates to a motor speed controlling apparatus.

In the conventional apparatus for maintaining constant the rotating speed of an electric motor, such control is performed by actuating a mechanical switch provided in a power source circuit or by imparting a braking force to the rotary shaft of the electric motor. With such an arrangement, however, it is often the case that trouble occurs there due to faulty contacts and the regulated speed tends to change.

There is another example of such conventional apparatus, wherein on the basis of the fact that a voltage appearing across the terminals of the electric motor is proportional to the rotating speed of the motor (this condition is established in the case of no load), this voltage is compared with a reference voltage to detect a speed difference signal, and the resistance of a controlling transistor connected in series with a power source is controlled in accordance with a signal resulting from the detection, thereby controlling the current flow through the electric motor. This circuit is shown in FIG. 9, wherein $M_9$ represents an electric motor to be controlled, and a speed difference detecting bridge circuit is constituted by resistors $R_{91}$, $R_{92}$, $R_{94}$ and $M_9$, and diodes $D_{91}$ and $D_{92}$ are connected across the opposite terminals of the electric motor. In this case, zener diodes are used for the diodes $D_{91}$ and $D_{92}$, and a voltage across them is utilized as the reference for the speed. The base of a transistor $T_{91}$ is connected with the connection point between the resistors $R_{91}$ and $R_{92}$, the emitter of the transistor $T_{91}$ is connected to the connection point between the resistors $R_{93}$ and the diode $D_{92}$, and the collector of the transistor $T_{91}$ is connected to the base of a control transistor $T_{91}$ of which the emitter and collector are connected in series with the electric motor $M_9$ between the resistor $R_{94}$ and a power source $E_9$. Thus, if the rotating speed of the electric motor $M_9$ becomes higher than a predetermined value, then the voltage across the opposite terminals of the electric motor becomes higher than the reference voltage established by the diodes $D_{91}$ and $D_{92}$, so that the emitter voltage of the transistor $T_{91}$ becomes higher than the base voltage thereof. As a result, the collector current of the transistor $T_{91}$ decreases so that the resistance of the control transistor $T_{92}$ is increased. Hence, the collector current of the transistor $T_{92}$ flowing through the electric motor $M_9$ via the resistor $R_{94}$ is decreased. In this way, the speed of the motor is limited. On the other hand, if the motor speed becomes lower than the predetermined value, then it is increased by the reverse operation to the above. However, this conventional system has such disadvantages that the control range with respect to load variations and voltage variations is narrow and hunting tends to occur due to brush noise.

In accordance with the present invention, the foregoing drawbacks can be effectively removed.

Accordingly, it is an object of the present invention to provide a motor speed controlling apparatus wherein use is made of a pressure-sensitive element of which the electrical resistance or voltage developed thereacross is varied in accordance with a pressure imparted thereto, a centrifugal force occurring at a rotary member is imparted to the sensitive element, and a current flowing through the motor is controlled in accordance with the variation in the electric resistance of the sensitive element.

Another object of the present invention is to provide a motor speed controlling apparatus wherein there are provided a means for producing a centrifugal force in accordance with the rotating speed of the motor and a sensitive element of which the electrical resistance or developed voltage is varied in accordance with the centrifugal force, and a current flowing through the motor is controlled in accordance with an unbalance current of a balanced bridge circuit including the sensitive element as one of the elements thereof, thereby controlling the electric motor at a constant speed.

Other objects, features and advantages of the present invention will become apparent from the following description taken in conjunction with the accompanying drawings, in which.

The embodiments of the present invention will be described with reference to the drawings.

Figure 1:
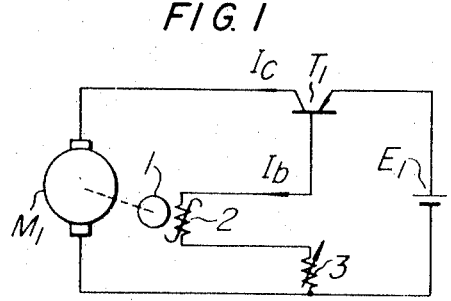
FIGS. 1 to 6 are circuit diagrams showing the motor speed controlling apparatus according to embodiments of the present invention, respectively.

Referring first to FIG. 1, $M_1$ represents an electric motor to be controlled the rotor of which is provided with a centrifugal force mechanism 1. There is provided an element 2 sensitive to a pressure or stress to which the centrifugal force of the mechanism 1 is applied. The sensitive element 2 has one end thereof connected with the base of a transistor $T_1$ of which the collector is connected with one of the terminals of the motor $M_1$. The other end of the sensitive element 2 is connected with the other terminal of the motor $M_1$ through a variable resistor 3 for speed regulation, and a power source $E_1$ is connected between the other terminal of the motor $M_1$ and the emitter of the transistor $T_1$. The sensitive element 2 may be one whose electrical resistance is varied upon application of a pressure thereto or one that a voltage produced thereby is varied upon application of a pressure thereto.

Figure 8:
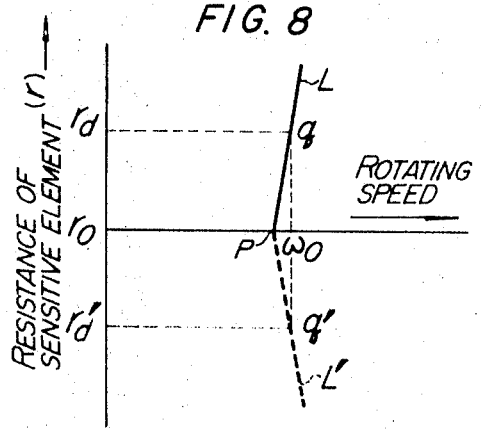
FIG. 8 is a view showing the characteristics of the sensitive element of said apparatus.
Figure 7A:
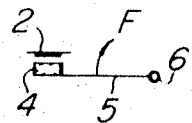
FIGS. 7a and 7b are views useful for the speed-detecting portion of said apparatus, respectively.

Referring now to FIG. 7a, there is schematically shown the aforementioned centrifugal force mechanism, wherein numeral 4 denotes a weight, and F indicates the centrifugal force and direction thereof. The weight 4 is connected to the rotary shaft 6 of the motor $M_1$ by means of a spring 5, so that there is produced a centrifugal force which is proportional to the product of the square of rotating speed $\omega$ and the weight $m$ of the weight 4. As the rotating speed $\omega$ increases, the weight 4 is brought closer to the sensitive element 2 by means of the centrifugal force. Immediately before the speed $\omega_0$ to which the motor is to be controlled is reached, the weight 4 is brought into contact with the sensitive element 2. That is, the weight 4 is brought in contact with the sensitive element 2 at a point P slightly short of that corresponding to the rotating speed $\omega_0$, as shown in FIG. 8. If it is assumed that the characteristic of the sensitive element 2 beyond this point (variations in the resistance value $r$ of the sensitive element with the rotating speed $\omega$) is represented by a straight line L, then the resistance value $r_d$ when the control speed $\omega_0$ is reached corresponds to the resistance value of the sensitive element 2 at that point.

Description will now be made of the operation of the foregoing arrangement. Assume that as a result of an increase of the rotating speed $\omega$ of the motor $M_1$ a pressure is imparted to the sensitive element 2 so that the resistance value $r$ of the sensitive element 2 is increased along the straight line L shown in FIG. 8. Then, a base current $I_b$ which has been flowing through the emitter of the transistor $T_1$ from the power source $E_1$ is decreased, and collector current $I_c$ is limited. Thus, the decrease of the current (namely, $I_c$) flowing through the motor $M_1$ results in a decrease of the rotating speed $\omega$ so that the resistance value $r$ of the sensitive element 2 is concomitantly decreased along the straight line L. Consequently, the base current $I_b$ is again increased so that the collector current $I_c$ is also increased, resulting in an increase of the rotating speed $\omega$ of the motor $M_1$. As will be appreciated from the foregoing, there is established a feedback system wherein the desired speed $\omega_0$ is adjusted by means of the variable resistor 3, the rotating speed $\omega$ of the motor $M_1$ which is an object to be controlled is detected by means of the sensitive element 2, and the base current $I_b$ and in turn the collector current $I_c$ of the transistor $T_1$ is controlled in accordance with the resistance value $r$ of the sensitive element, thereby controlling the rotating speed $\omega$ of the motor $M_1$. When a point $q$ on the characteristic line of the sensitive element 2 or the desired rotating speed $\omega_0$ is reached, the resistance value is balanced with the point corresponding to $r_d$ as the equilibrium point. At this point, if the voltage of the power source $E_1$ is increased or decreased, then the equilibrium point $q$ is slightly shifted so that the rotating speed can be made to fall within a predetermined range of variation. Then, resistors $R_{32}$, $R_{42}$, $R_{52}$ and $R_{62}$ operate as the standard of the rotating speed.

Figure 2:
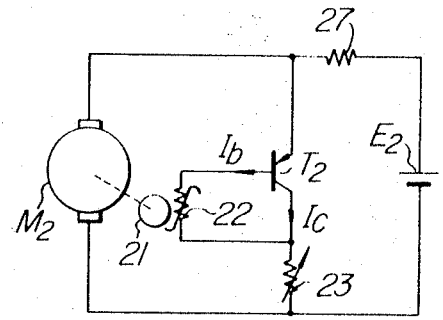
Figure 7B:
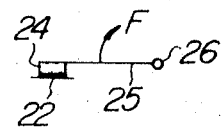
Figure 9:
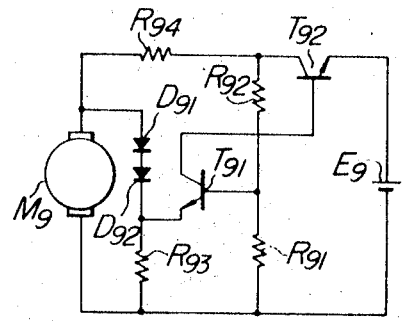
FIG. 9 is a circuit diagram showing a conventional motor speed controlling apparatus.

FIG. 2 shows a second embodiment of the present invention, which is a parallel control system. This parallel control system in FIG. 2 operates in substantially the same manner as the series control system shown in FIG. 1. In FIG. 2, a sensitive element 22 is associated with a centrifugal force mechanism 21 in such a manner that the higher the speed of a motor $M_2$, the lower becomes the resistance value $r$ of the sensitive element 22. FIG. 7b schematically shows the centrifugal force mechanism. In FIG. 8, the relationship between the rotating speed and the resistance value of the sensitive element 22 is shown by a straight line $L'$. When the speed becomes higher than a predetermined level, a transistor $T_2$ is rendered conductive so that a great voltage drop is developed across a resistor 27 connected in series with a power source $E_2$ so that the rotating speed $\omega$ of the motor $M_2$ is decreased. Numeral 23 represents a variable resistor, 24 a weight, 25 a spring, and 26 a rotary shaft.

As described above, in accordance with the present invention, speed control is performed by utilizing a pressure-sensitive element, without using any contacts. Thus, there is no possibility of trouble due to faulty contacts, and it is less likely that the regulated speed is varied, so that the life span of the present device can be widened and the operation thereof can be stabilized. Furthermore, since use is made of the resistance gradient of a sensitive element rather than the opening-closing operation of a switch, wherein a current is suddenly made to flow when the speed exceeds a predetermined value while when the speed becomes lower than the predetermined value the current flow is immediately cut off as in the prior art, any infinitesimal rotational irregularity is momentarily fed back, thus resulting in a remarkable effect of restraining rotational irregularities. In the case where such rotational irregularities constitute no problem, it is possible, of course, to make the present apparatus operate in a manner similar to on-off operation.

Figure 3:
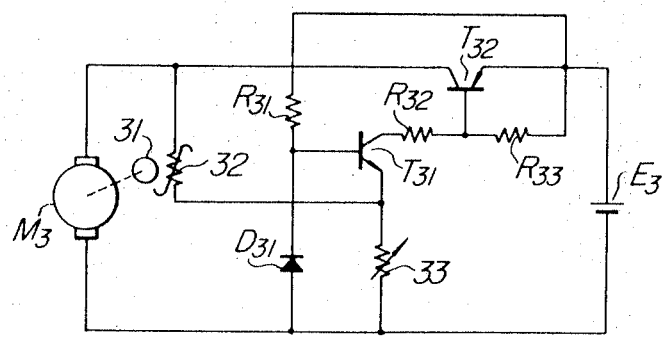

FIG. 3 shows a third embodiment of the present invention, wherein $M_3$ is an electric motor to be controlled the rotor of which is provided with a centrifugal force mechanism 31. There is provided an element 32 sensitive to a pressure to which the centrifugal force of the mechanism 31 is applied. A bridge circuit is constituted by the sensitive element 32, a reference voltage zener diode $D_{31}$ (a reference voltage source such as a battery may be used in place of it), resistor $R_{31}$ and variable resistor 33. There is provided a transistor $T_{31}$ having the base and the emitter thereof connected with the connection point between the diode $D_{31}$ and the resistor $R_{31}$ and that between the sensitive element 32 and the variable resistor 33 respectively. Further, resistors $R_{32}$ and $R_{33}$ are connected with the collector of the transistor $T_{31}$, and the base of a control transistor $T_{32}$ is connected with the connection point between the resistors $R_{32}$ and $R_{33}$, with the emitter and the collector of the transistor $T_{32}$ being connected with a power source $E_3$ and the motor $M_3$ respectively. The resistance value $r$ of the sensitive element 32 is decreased with an increase of the rotating speed of the motor $M_3$, as shown by the straight line $L'$ in FIG. 8. It is assumed that the resistance value of the sensitive element 32 at a point $q'$ corresponding to the speed $\omega_0$ to which the motor is to be controlled is $r_d'$.

Description will now be made of the operation of the embodiment shown in FIG. 3. If the rotating speed $\omega$ of the motor $M_3$ is lower than $\omega_0$, then the resistance value $r$ of the sensitive element 32 is so high that the emitter voltage of the transistor $T_{31}$ is lower than the base voltage thereof so that a high collector current is permitted to flow through the transistor $T_{31}$ via the resistors $R_{32}$ and $R_{33}$. Part of the collector current is supplied to the control transistor $T_{32}$ as base current to decrease the impedance value of the transistor $T_{32}$, so that an increased current is made to flow through the motor $M_3$. As the rotating speed $\omega$ increases, the resistance value $r$ of the sensitive element 32 decreases along the straight line $L'$ so that the emitter voltage of the transistor $T_{31}$ builds up. However, since the base voltage of the transistor $T_3$ is maintained constant with the aid of the diode $D_{31}$, the collector current thereof is decreased so that the base current of the transistor $T_{32}$ is restricted. Thus, the impedance value of the transistor $T_{32}$ increases. The result is that the current flowing through the motor $M_3$ is limited so that the rotating speed $\omega$ is decreased to be controlled to the preset value $\omega_0$. If the voltage of the power source $E_3$ is decreased due to consumption of the battery or the like, then the rotating speed of the motor $M_3$ is decreased so that the resistance value of the sensitive element 32 is increased and the potential difference across the motor $M_3$ is decreased, thus resulting in a great potential difference between the base and the emitter of the transistor $T_{31}$. Thus, the collector current of the transistor $T_{31}$ is increased to decrease the resistance between the emitter and the collector of the transistor $T_{32}$ so that the voltage drop across the transistor $T_{32}$ is decreased. In this way, any decrease in the voltage of the power source $E_3$ is compensated for. The foregoing operation is possible only in the case where the base current of the transistor $T_{31}$ is maintained constant. Therefore, the diode $D_{31}$ is provided to serve as the reference for the power source voltage.

Figure 4:
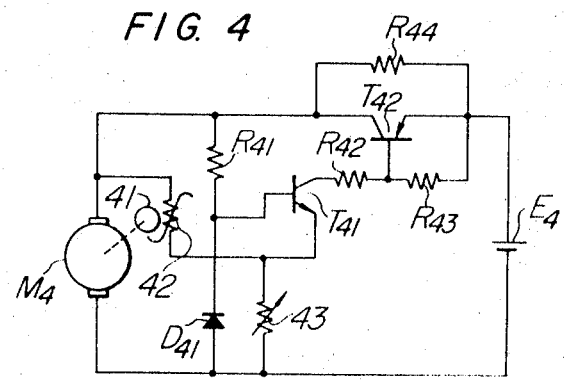
Figure 5:
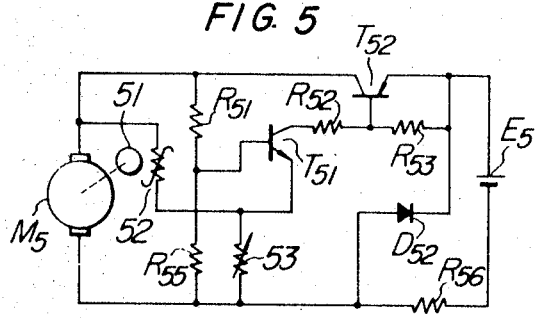
Figure 6:
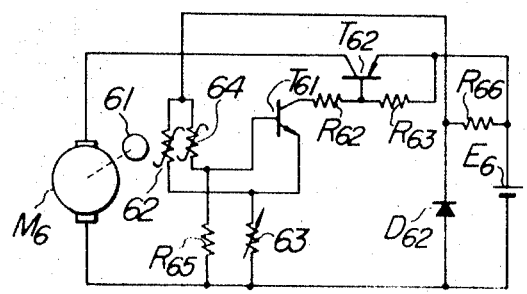

Next, description will be made of the embodiments shown in FIGS. 4 to 6. Basically, these embodiments operate in the same manner as the one shown in FIG. 3, although the former is slightly different from the latter in respect of their characteristics. In each of these embodiments, a centrifugal force produced by a centrifugal force mechanism associated with the rotor of an electric motor is imparted to a sensitive element, whereby the resistance value of the sensitive element is varied so that the balanced condition of a bridge circuit is changed to thereby control the speed of the motor. The speed reference depends upon the resistance value $r_d$, $r_d'$, etc. of the aforementioned sensitive element. In FIG. 4, a resistor $R_{41}$ is coupled to a point where a controlled voltage appears or the collector of a transistor $T_{42}$. Further, a starting resistor $R_{44}$ is connected across the emitter and collector of the transistor $T_{42}$. In FIG. 5, a resistor $R_{55}$ is connected in place of the zener diode $D_{31}$ shown in FIG. 3, and a diode $D_{52}$ and resistor $R_{56}$ is connected in series across the opposite terminals of a power source $E_5$, thereby making constant the voltage of the power source. With the arrangement of FIG. 5, the characteristic is greatly improved. However, since part of the operation performed by the diode $D_{31}$ in FIG. 3 is to be performed by the diode $D_{52}$, it is necessary to use a diode having a greater capacity as $D_{52}$. The zener diode $D_{52}$ is not essential to obtain exact speed control performance. In order to compensate for this, the arrangement of FIG. 6 has been devised. That is, in view of the fact that satisfactory speed control can be achieved only if the voltage imparted to the bridge circuit is stabilized, a diode $D_{62}$ is connected across the pair of terminals of the bridge circuit. Thus, the current flowing through the diode $D_{62}$ may be low, and therefore the capacity thereof may be small. Furthermore, the sensitivity is improved by providing a second sensitive element 64 of which the characteristic is the reversal of that of the sensitive element 62 as shown by the straight line $L'$ in FIG. 8, in place of the resistor 64 shown in FIG. 5.

In FIGS. 3 to 6, $M_3$, $M_4$, $M_5$ and $M_6$ are electric motors, 31, 41, 51 and 61 indicate centrifugal force mechanisms, 32, 42, 52, 62 and 64 sensitive elements respectively, 33, 43, 53 and 63 variable resistors, $R_{31}$, $R_{32}$, $R_{33}$, $R_{34}$, $R_{41}$, $R_{42}$, $R_{43}$, $R_{44}$, $R_{51}$, $R_{52}$, $R_{53}$, $R_{55}$, $R_{56}$, $R_{62}$, $R_{63}$, $R_{65}$ and $R_{66}$ resistors, $D_{31}$, $D_{41}$, $D_{52}$ and $D_{62}$ diodes, $T_{32}$, $T_{41}$, $T_{42}$, $T_{51}$, $T_{52}$, $T_{61}$ and $T_{62}$ transistors, and $E_3$, $E_4$, $E_5$ and $E_6$ power sources respectively.

As described above, in accordance with the present invention, a pressure-sensitive element is incorporated as one of the elements constituting a bridge circuit, thereby making it possible to perform speed control with a contactless arrangement. Thus, there is no possibility of trouble due to faulty contacts, and it is less likely that the controlled speed is changed. Consequently, the life span of the present apparatus can be widened, and the stability thereof can be improved. Furthermore, since the resistance value of the aforementioned sensitive element is utilized as the speed reference, it is not necessary to effect regulation by means of a centrifugal force spring and provide any constant power source for speed reference. The speed regulation can be performed by means of an external static circuit. Still furthermore, since there is provided the element for detecting variations in the power source voltage, control can be achieved with respect to not only load variations but also power source voltage variations. Thus, there is provided a greatly improved control apparatus according to the present invention.

What is claimed is:

1. A motor speed controlling apparatus comprising a centrifugal force mechanism for producing a centrifugal force in accordance with the rotation of an electric motor, a pressure-sensitive element of which the impedance or electromotive force is varied in accordance with said centrifugal force imparted thereto, a balanced bridge circuit including said pressure-sensitive element as one of the elements thereof, and a transistor for controlling a current flowing through said electric motor in accordance with an unbalance current flowing through said balanced bridge circuit, said transistor being connected between said electric motor and a power source.

2. A motor speed controlling apparatus comprising a centrifugal force mechanism for producing a centrifugal force in accordance with the rotation of an electric motor, a pressure-sensitive element of which the impedance or electromotive force is varied in accordance with said centrifugal force imparted thereto, a balanced bridge circuit including said pressure-sensitive element as one of the elements thereof, a transistor for controlling a current flowing through said electric motor in accordance with an unbalance current flowing through said balanced bridge circuit, said transistor being connected between said electric motor and a power source, and a potential reference for controlling variations in the speed of said electric motor due to variations in the voltage of said power source.

* * * * *